United States Patent [19]

Schaedler

[11] Patent Number: 6,073,432
[45] Date of Patent: *Jun. 13, 2000

[54] BAG-FULL INDICATOR MECHANISM

[75] Inventor: Axel Schaedler, North Royalton, Ohio

[73] Assignee: MTD Products Inc, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/302,627

[22] Filed: Apr. 30, 1999

Related U.S. Application Data

[62] Division of application No. 08/908,357, Aug. 7, 1997, Pat. No. 5,950,408.
[60] Provisional application No. 60/053,723, Jul. 25, 1997.

[51] Int. Cl.⁷ ............................ A01D 43/00; A01D 43/06
[52] U.S. Cl. ........................... 56/202; 56/199; 56/DIG. 8
[58] Field of Search ........................ 56/202, 194, 203, 56/16.6, 199, 200, DIG. 8; 91/454, 462, 465, 456, 448, 444

[56] References Cited

U.S. PATENT DOCUMENTS

| | | | |
|---|---|---|---|
| 3,367,459 | 2/1968 | Rubin | 192/11 |
| 3,543,892 | 12/1970 | Baillie | 192/11 |
| 3,656,595 | 4/1972 | Gethmann et al. | 192/13 R |
| 3,863,428 | 2/1975 | Baxter | 56/10.2 |
| 3,901,342 | 8/1975 | Nunn, Jr. | 180/79.2 R |
| 3,908,345 | 9/1975 | Oni et al. | 56/208 |
| 3,949,540 | 4/1976 | Christopher et al. | 56/202 |
| 4,295,327 | 10/1981 | Bortolussi | 56/11.3 |
| 4,364,301 | 12/1982 | Kawabata et al. | 91/20 |
| 4,388,856 | 6/1983 | Cook | 91/49 |
| 4,416,033 | 11/1983 | Specht | 15/339 |
| 4,433,532 | 2/1984 | McCunn | 56/320.2 |
| 4,437,386 | 3/1984 | Baumgartner | 91/363 R |
| 4,443,997 | 4/1984 | Namdari | 56/13.3 |
| 4,515,066 | 5/1985 | Ito et al. | 91/454 |
| 4,531,348 | 7/1985 | De Vilder et al. | 56/11.6 |
| 4,598,536 | 7/1986 | Langley | 56/202 |
| 4,622,859 | 11/1986 | Hobson | 74/15.88 |
| 4,635,047 | 1/1987 | Fox et al. | 340/684 |
| 4,669,361 | 6/1987 | Ito et al. | 91/459 |
| 4,735,136 | 4/1988 | Lee et al. | 100/52 |
| 4,756,234 | 7/1988 | Anderson | 91/454 |
| 4,799,418 | 1/1989 | Takahashi et al. | 91/449 |
| 4,831,915 | 5/1989 | Roach | 92/49 |
| 4,835,949 | 6/1989 | Seyerle | 56/10.8 |
| 4,907,403 | 3/1990 | Jones | 56/202 |
| 4,928,458 | 5/1990 | Muroya et al. | 56/11.8 |
| 4,981,011 | 1/1991 | Olejak | 56/10.2 |
| 5,321,910 | 6/1994 | Legendre et al. | 49/324 |
| 5,388,394 | 2/1995 | Heismann | 56/194 |
| 5,477,642 | 12/1995 | Legendre | 49/340 |
| 5,605,033 | 2/1997 | Olmr | 56/10.2 R |
| 5,636,444 | 6/1997 | Nickel | 30/276 |
| 5,651,422 | 7/1997 | Casali | 180/13 |
| 5,775,077 | 7/1998 | Olmr | 56/202 |

FOREIGN PATENT DOCUMENTS

| | | | |
|---|---|---|---|
| 59-145631 | 8/1984 | Japan | 25/2 |
| 2221827 | 2/1990 | United Kingdom | 34/0 |

OTHER PUBLICATIONS

International Search Report PCT/US98/12303.

*Primary Examiner*—Robert E. Pezzuto
*Assistant Examiner*—Arpad Fabian Kovacs
*Attorney, Agent, or Firm*—Emerson & Associates; Roger D. Emerson; Timothy D. Bennett

[57] ABSTRACT

A bag-full indicator mechanism is provided for use on a mower that has a mower deck with cutting blades, a bag for collecting cut vegetation, and a chute communicating the mower deck with the bag. The bag-full indicator mechanism includes a vacuum actuator, a vacuum for providing a vacuum to the vacuum actuator, and a sensor for sensing that the bag is full. Preferably the vacuum is the intake manifold of the mower engine. The bag-full indicator mechanism also includes activator for activating the vacuum actuator and includes a switch and a pivotable lever. Finally, an indicator is used for indicating that the bag is full and preferably includes a shutoff for stopping the rotation of the cutting blades.

11 Claims, 7 Drawing Sheets

BAG-FULL INDICATOR MECHANISM

This is a divisional application that claims priority from the previously filed application bearing Ser. No. 08/908,357 filed Aug. 7, 1997. Now U.S. Pat. No. 5,950,408, which itself claims priority from U.S. Provisional patent application No. 60/053,723 filed Jul. 25, 1997.

BACKGROUND OF THE INVENTION

1. Field of Invention

This invention pertains to the art of methods and apparatuses for lawn mowers, and more specifically to methods and apparatuses for using a vacuum actuator to determine when a riding lawn mower bag is full.

2. Description of the Related Art

It is well known in the art of lawn mowers to provide a bag for collecting the vegetation cut by cutting blades within a mower deck. It is advantageous to be able to determine when such a bag is full so that it can be emptied in a timely fashion. This provides the best overall operation for the lawn mower.

U.S. Pat. No. 5,388,394 to Heismann discloses a bag-full indicator that purportedly indicates when the bag of a riding lawn mower is full by utilizing the venturi effect. Such a bag-full indicator, however, only provides a visual indication that the bag is full.

The present invention provides methods and apparatuses for a bag-full indicator mechanism that utilizes a vacuum actuator and can be used for any indicating means, such as to stop the cutting blades from cutting. The difficulties inherent in the art are therefore overcome in a way that is simple and efficient while providing better and more advantageous results.

SUMMARY OF THE INVENTION

According to one aspect of the present invention, there is provided a bag-full indicator mechanism for use on a mower. The bag-full indicator mechanism includes a vacuum actuator, vacuum means for providing a vacuum to the vacuum actuator, sensing means for sensing that the bag is full, activating means for selectively activating the vacuum actuator and indicating means for indicating that the bag is full.

According to another aspect of the present invention the bag-full indicator mechanism uses a sensing means that includes a membrane which covers an aperture in a chute which communicates a mower deck with a bag. It also includes activating means that uses switching means and a pivoting lever.

According to another aspect of the present invention, there is provided a method of indicating that a bag is full. The method comprises the steps of forcing a membrane in an outer direction, pivoting a lever, switching a switching means removing a vacuum from within a vacuum actuator and indicating that the bag is full.

One advantage of the present invention is that it is easy to manufacture and can be made economically.

Another advantage of the present invention is that an intake manifold, typically used in internal combustion engines, can be used as a vacuum source.

Another advantage of the invention is that the indicating means that indicates that the bag is full can be used for a variety of purposes, such as to stop the rotation of the cutting blades.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
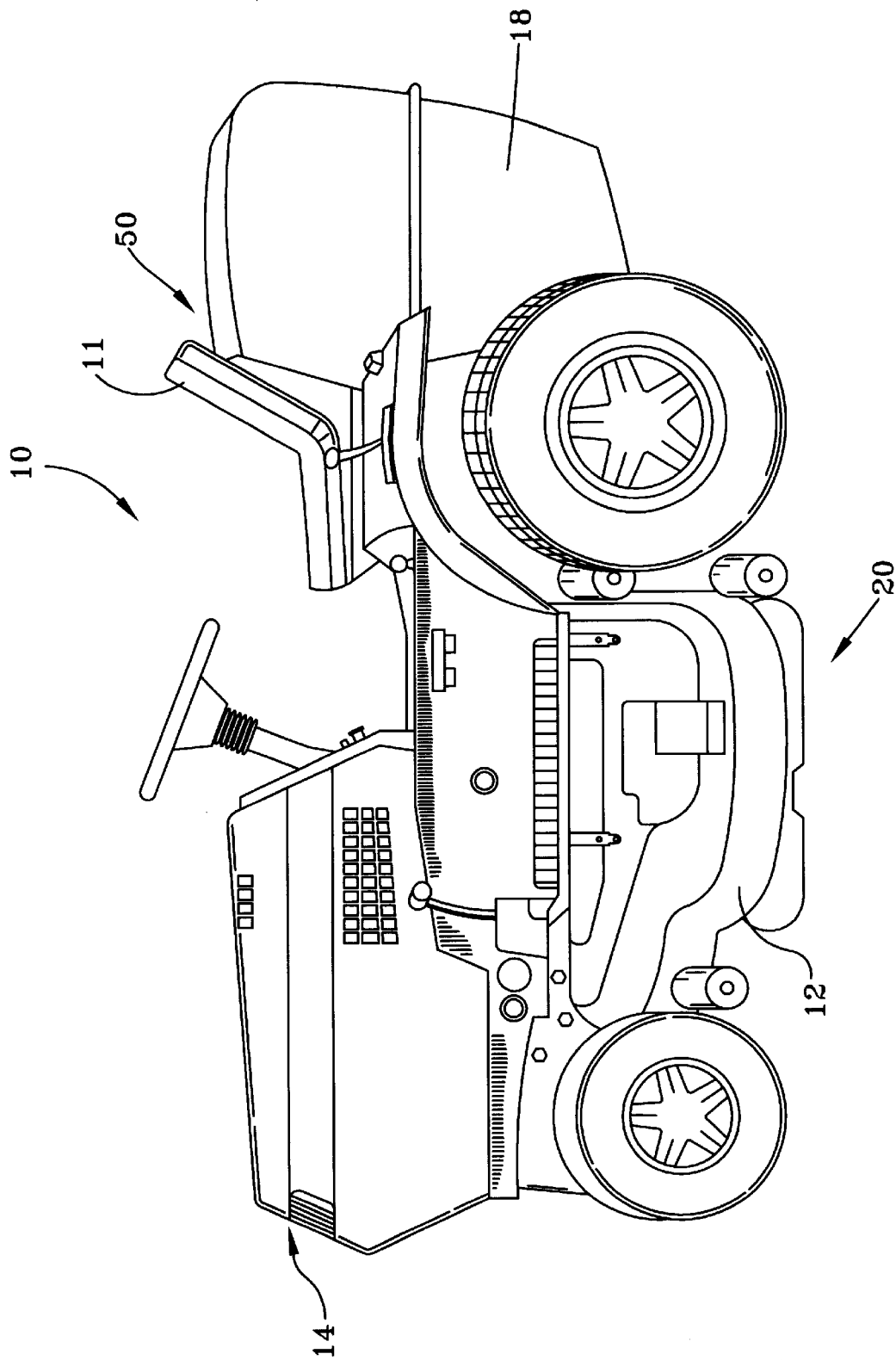
FIG. 1 is a perspective side view of a typical riding lawn mower that is equipped with the bag-full indicator mechanism of the present invention.
Figure 4:
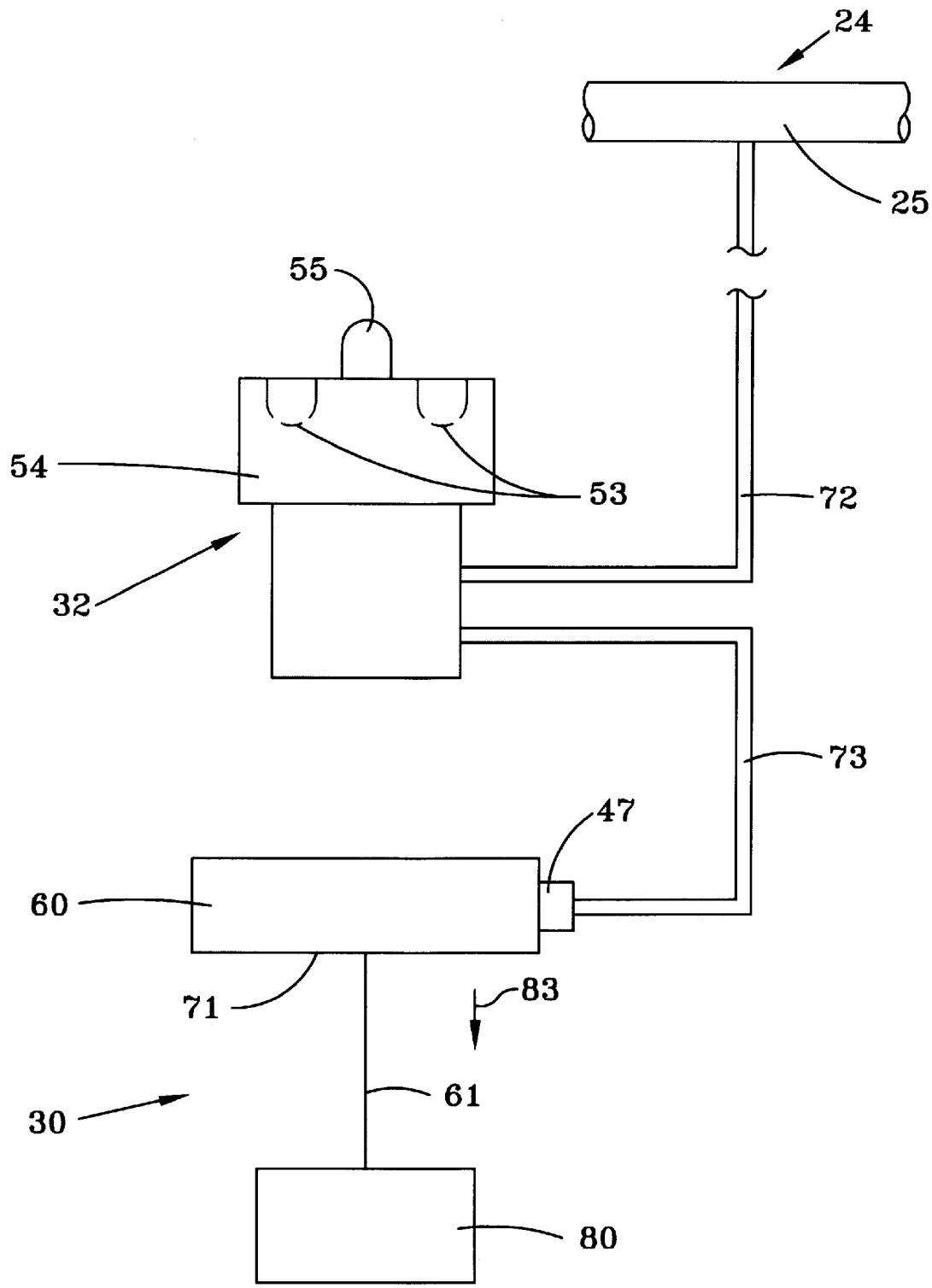
FIG. 4 is a schematic representation showing how an air valve communicates with a vacuum means and a vacuum actuator.
Figure 5:
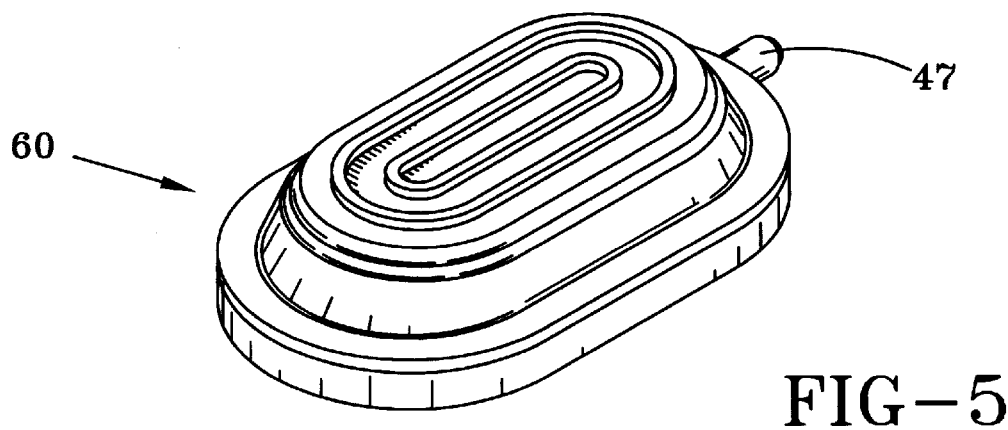
FIG. 5 is a perspective top view of the preferred vacuum actuator of the present invention.
Figure 6:
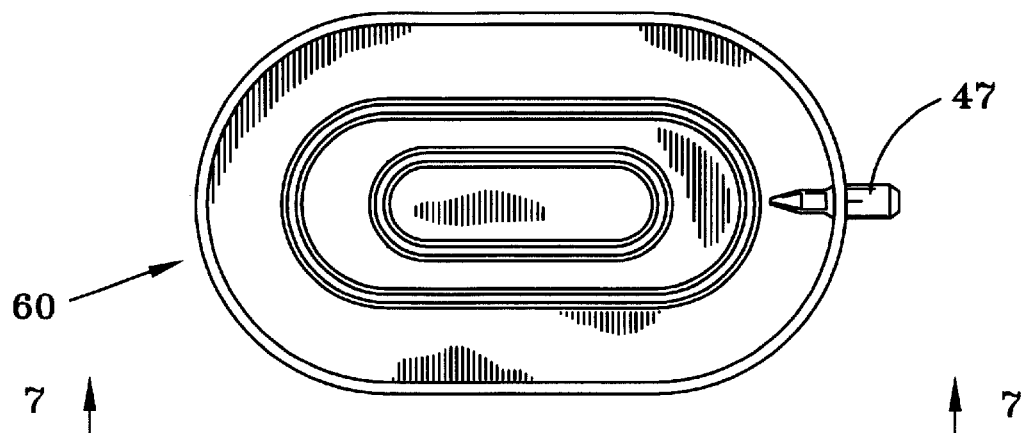
FIG. 6 is a top view of the vacuum actuator of FIG. 5 taken along the line 6—6 of FIG. 7 showing the connection port.
Figure 7:
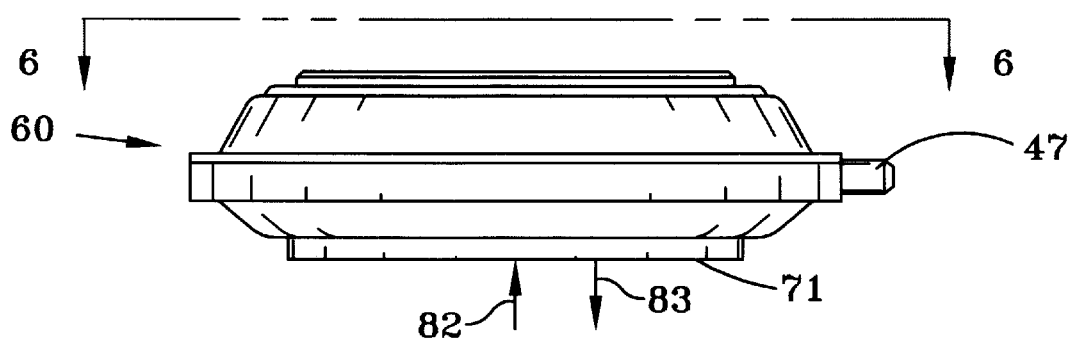
FIG. 7 is a side view of the vacuum actuator of FIG. 5 taken along the line 7—7 of FIG. 6 showing that a first side can be moved.

Referring now to the drawings wherein the showings are for purposes of illustrating a preferred embodiment of the invention only and not for purposes of limiting the same, FIG. 1 shows a riding mower 10 which is equipped with a bag-full indicator mechanism 50 in accordance with this invention. This preferred embodiment is directed to a riding lawn mower but the invention is applicable to walk-behind mowers, off-the-road vehicles, and other applications as well. The riding mower 10 includes an operator seat 11, a mower deck 12 and an engine 14. The engine 14 can be of any type currently used in the art but that preferably includes a vacuum means 24 such as an intake manifold 25 as shown in FIG. 4. It should be noted that other vacuum means can also be used for this invention. The mower deck 12 has cutting blades 20 for use in cutting associated vegetation (not shown). The engine 14 is used to provide power for the cutting blades 20 as is commonly known in the art. The riding mower 10 also includes a bag 18 that is used to collect the vegetation cut by the cutting blades 20.

Referring now FIGS. 1–4, the bag-full indicator mechanism 50 of this invention includes a vacuum actuator 60, vacuum means 24 for providing a vacuum to the vacuum actuator 60, sensing means 26 for sensing that the bag 18 is full, activating means 28 for selectively activating the vacuum actuator 60 and indicating means 30 for indicating that the bag 18 is full.

With reference now to FIGS. 4–8, any vacuum actuator chosen with sound engineering judgement is useful for this invention. The vacuum actuator 60 has a connection port 47 for operative connection to the vacuum means 24 shown in FIG. 4. In the preferred embodiment, the connection port 47 is connected to a vacuum line 73. The vacuum actuator 60 also has a first side 71 which moves in inward direction 82 as a vacuum is established inside the vacuum actuator 60. When a vacuum within the vacuum actuator 60 is removed, the first side moves in outward direction 83. Therefore, the vacuum actuator 60 can be initiated by either establishing or removing a vacuum within the vacuum actuator 60. The first side 71 of the vacuum actuator 60 will move accordingly. Such movement of the first side 71 of the vacuum actuator 60 can be used with the indicating means 30 as will be discussed further below.

Figure 8:
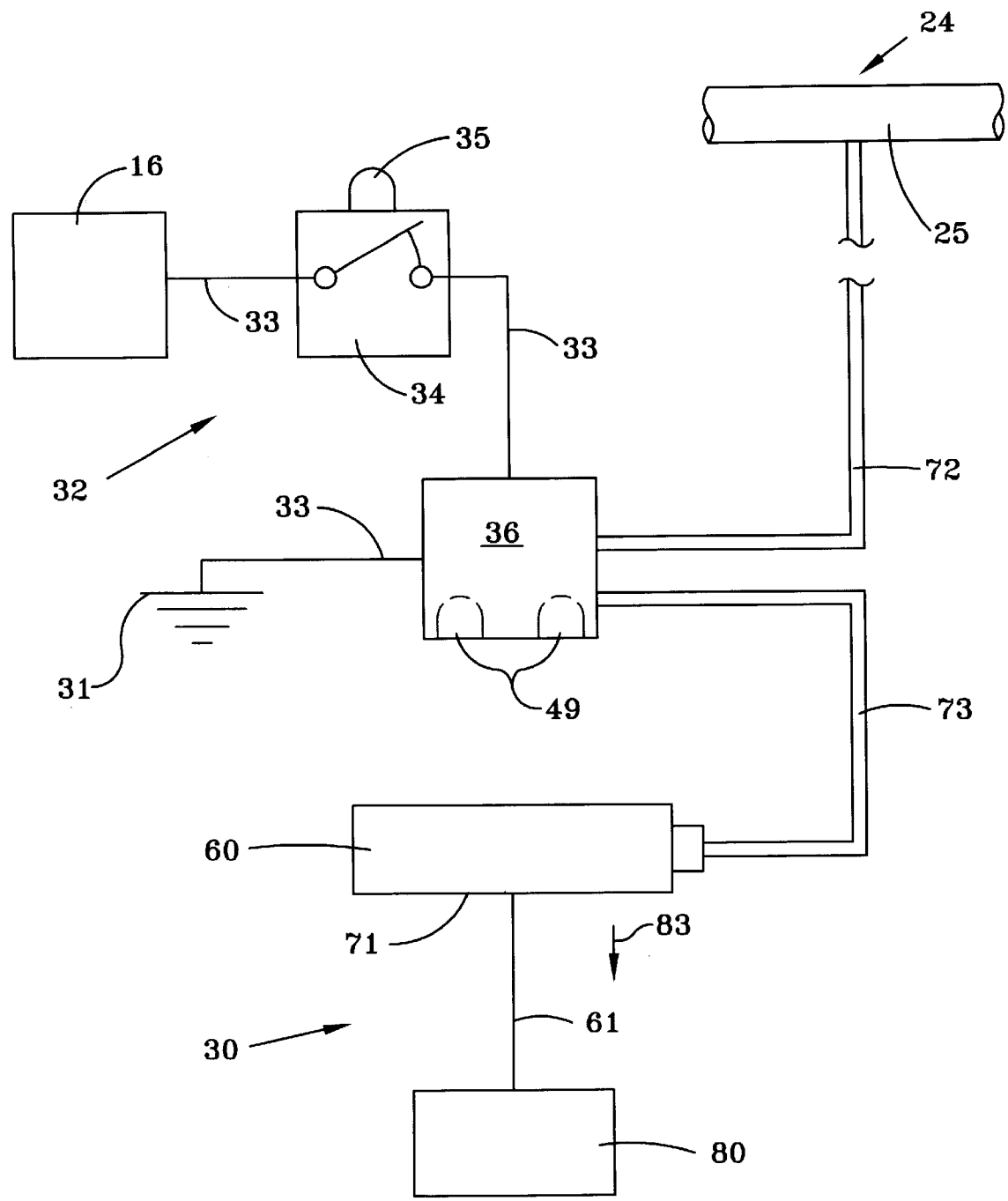
FIG. 8 is a schematic representation using an alternate switching means and showing how a solenoid valve communicates with a vacuum means and a vacuum actuator, and showing how an electric switch is used to activate the solenoid valve.

With reference now to FIGS. 1, 4 and 8, in the preferred embodiment the engine 14 of the riding mower 10 has an intake manifold 25 as is commonly known in the art. The intake manifold 25 is preferably used as the vacuum means 24 for providing a vacuum to the vacuum actuator 60. In this way, as long as the engine 14 of the riding mower 10 is running, there is a vacuum means 24 available for the bag-full indicator mechanism 50. A vacuum source line 72 communicates the intake manifold 25 to a switching means 32 that will be discussed further below.

With reference now to FIGS. 1–4, the riding mower 10 has a chute 52 that communicates the mower deck 12 to the bag 18. As is commonly known in the art, the rotation of the cutting blades 20 within the mower deck 12 by the engine 14 creates a positive pressure forcing the cut vegetation through the chute 52 and into the bag 18. The sensing means 26 of this invention can be of any type chosen with sound engineering judgement but is preferably operatively associated with the chute 52 and is responsive to changing pressures within the chute 52. In the preferred embodiment, the sensing means 26 is operatively connected to an aperture 77 in the chute 52. In particular, it is preferred that a membrane 62 cover the aperture 77 in the chute 52. The membrane 62 includes a rigid portion 63 and a flexible portion 64 that preferably surrounds the rigid portion 63. The flexible portion 64 of the membrane 62 permits the rigid portion 63 to move in either outer direction 75 or inner direction 76. By outer direction 75 it is meant that the membrane 62 can move out from the chute 52. Likewise, by inner direction 76 it is meant that the membrane 62 can move inward toward the chute 52. It should be noted that the membrane 62 will remain in its de-activated position (shown in FIGS. 2 and 3) until the pressure within the chute 52 becomes significantly greater than the atmospheric pressure outside of the chute 52. When the pressure within the chute 52 reaches a predetermined value, the rigid portion 63 of the membrane 62 is forced in outer direction 75. In other words, as the membrane 62 is activated it is forced in outer direction 75.

With continuing reference to FIGS. 1–4, the activating means 28 used to selectively activate the vacuum actuator 60 can also be of any type chosen with sound engineering judgement. In this preferred embodiment the activating means 28 includes the switching means 32 and a lever 58. The lever 58 has a first end 57 and a second end 59. The second end 59 is pivotably connected to a pivot member 68 that is fixedly connected to the chute 52. The first end 57 of the lever 58 is pivotably connected to a spring 66. The spring 66 biases the lever 58 to hold the membrane 62 against the aperture 77. In other words, the spring 66 biases the membrane 62 in its de-activated position. The spring 66 is pivotably connected to a spring extension member 67 that is fixedly connected to the chute 52. An adjustment screw 74 permits the spring 66 to have its tension force i.e., biasing force, adjusted. By turning the adjustment screw 74, the length of the spring 66, and therefore its tension force, can be adjusted. Fixedly connected to the lever 58 is a lever extension 56 that is used in contacting the rigid portion 63 of the membrane 62. Alternately, the lever extension 56 can be an integral portion of the lever 58. Positioned beneath the second end 59 of the lever 58 is the switching means 32. A reset button 70 can be used to force the membrane 62 into a de-activated condition as will be described further below.

Figure 2:
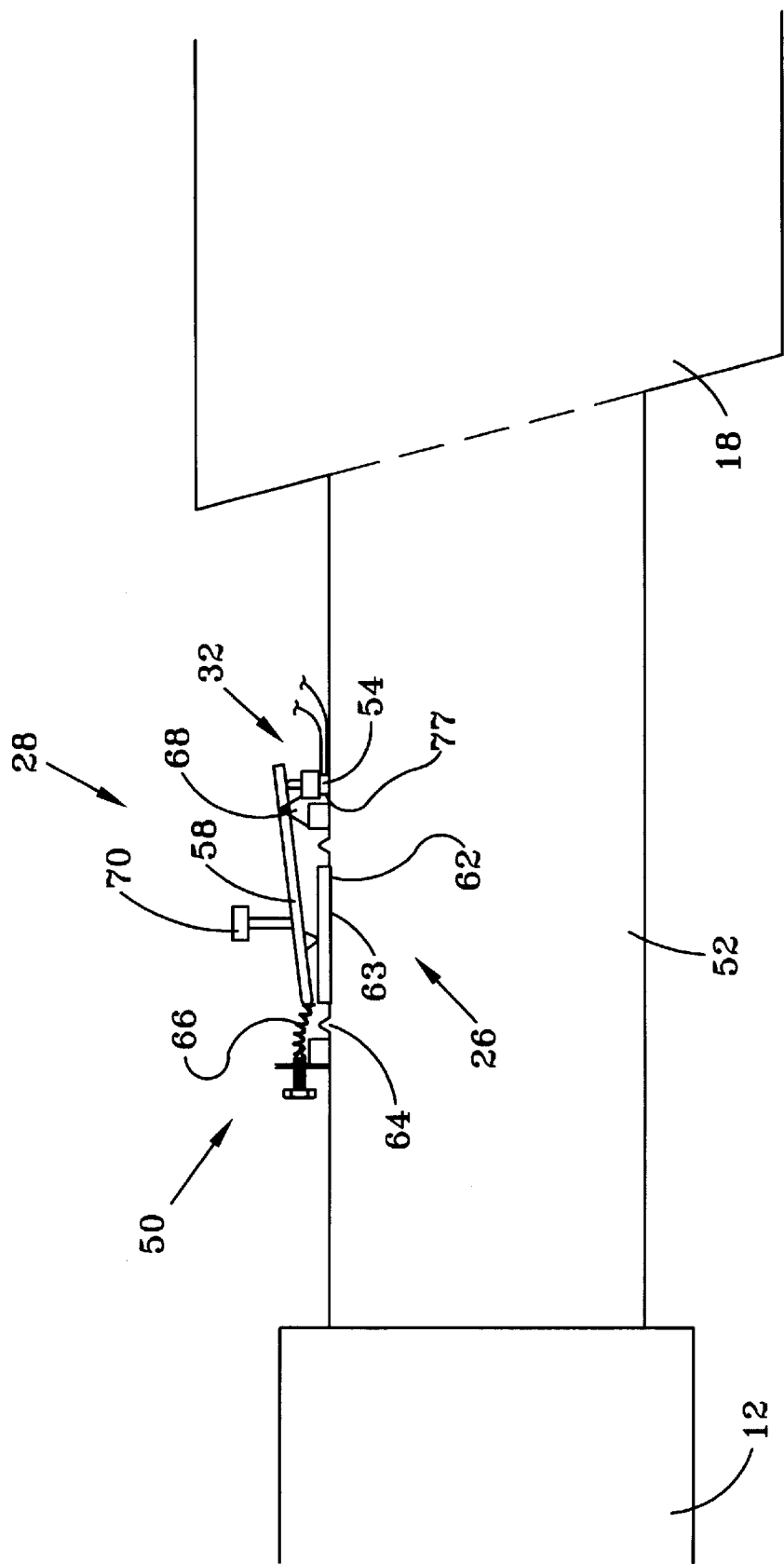
FIG. 2 is a schematic representation of the bag-full indicator mechanism of this invention shown positioned on a chute between the mower deck and the bag.
Figure 3:
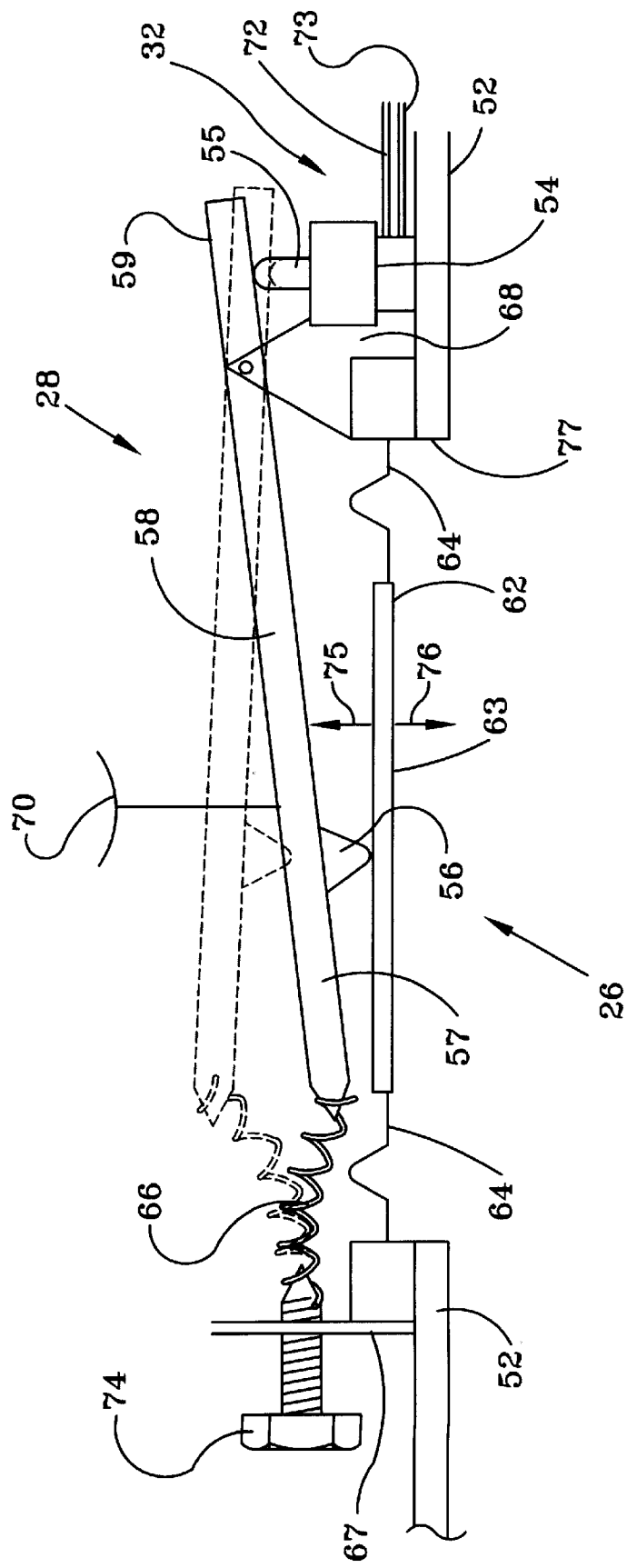
FIG. 3 is an enlarged schematic representation of the bag-full indicator mechanism showing how the lever is used to activate a switching means.

With reference now to FIGS. 2–4, the switching means 32 can be of any type chosen with sound engineering judgement. Two alternative embodiments of the switching means 32 are herein disclosed. The switching means 32 shown in FIGS. 2–4, includes an air valve 54 having a tip 55 and holes 53 that permit air to enter the system when the air valve 54 is closed. When the tip 55 is pressed by the second end 59 of the lever 58, the air valve 54 can be opened and closed.

Alternately, with reference now to FIGS. 1 and 8, the switching means 32 includes an electric switch 34 having a tip 35 and a solenoid valve 36. The electric switch 32 is positioned beneath the second end 59 of the lever 58 as was the air valve 54 shown in FIG. 3. The solenoid valve 36, as is commonly known in the art, activates, i.e., opens and closes, in response to an electric signal. The solenoid valve 36 has holes 49 that permit air to enter the system when the solenoid valve 36 is closed. This embodiment includes a power source 16 that is preferably operatively associated with the engine 14 of the riding mower 10, the electric switch 34, the solenoid valve 36 and a ground 31 all connected in electric series by wiring 33. When the tip 35 is pressed by the second end 59 of the lever 58, the electric switch 34 can be opened and closed. When the electric switch 34 is closed, an electric signal proceeds from the power source 16 through the electric switch 34 and to the solenoid valve 36. This activates the solenoid valve 36.

With reference now to FIGS. 1, 4 and 8, the indicating means 30 for use in indicating that the bag 18 is full can also be of any type chosen with sound engineering judgement. The indicating means 30 can be used for many purposes such as to light a light (not shown) on the lawn mower 10, thereby notifying the operator that the bag 18 is full. Alternately, the indicating means 30 can be used to create a sound of warning to the operator. In the preferred embodiment the indicating means 30 is used to stop the cutting blades 20 from rotating, i.e., cutting, when the bag 18 is full. In this way, the riding mower 10 will not continue filling the bag 18 when the bag 18 is already full. Therefore, in the preferred embodiment the indicating means 30 includes a connector link 61 and shut-off means 80. The connector link 61 is operatively connected to the first side 71 of the vacuum actuator 60. Therefore, when a vacuum is removed from within the vacuum actuator 60 and therefore, the first side 71 of the vacuum actuator 60 is moved in outward direction 83, the connector link 61 will also be moved in outward direction 83. Preferably, the shut-off means 80 is operatively connected to the connector link 61.

Figure 9:
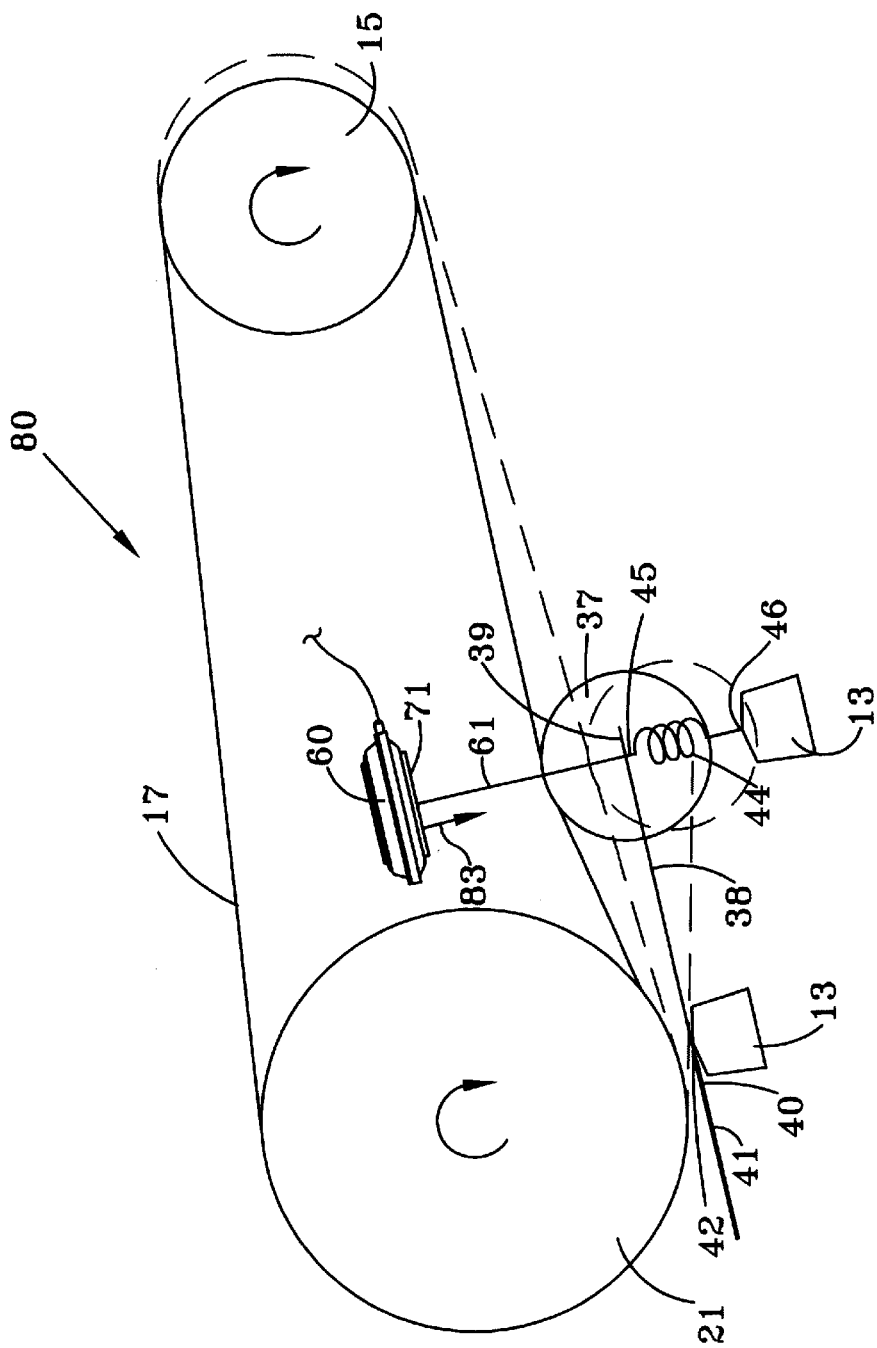
FIG. 9 is a schematic representation showing the preferred shut-off means of this invention that includes an idler pulley, a brake member and a return spring.

With reference now to FIGS. 1, 4, 8 and 9, the shut-off means 80 will be discussed further. It should be noted that the shut-off means 80 to be disclosed herein is simply one example. This invention is useful with any shut-off means 80 chosen with sound engineering judgement. As is commonly known in the art, the engine 14 includes an engine pulley 15 and the mower deck 12 includes a mower deck pulley 21 which is used to rotate the cutting blades 20. A belt 17 operatively connects the engine pulley 15 to the mower deck pulley 21. An idler pulley 37 is used to engage and disengage the belt 17. It should be noted that when the belt 17 is disengaged it means that the engine pulley 15 does not rotate the mower deck pulley 21 and therefore the cutting blades 20 do not cut, i.e., rotate. The connector link 61 is pivotably connected to a first end 39 of a brake member 38. A return spring 44 has a first end 45 pivotably connected to the first end 39 of the brake member 38 and a second end 46 pivotably connected to the body 13 of the riding mower 10. The brake member 38 also has a second end 41 that has a brake puck 40 rigidly attached thereon. The brake member 38 is pivotably connected to the body 13 of the riding mover 10 at pivot point 42. The solid lines in FIG. 9 show the shut-off means 80 in its engaged condition, whereas the dashed lines show the shut-off mean 80 in its disengaged condition.

Referring now to FIGS. 1–4, the bag-full indicator mechanism 50 is operated as follows. FIGS. 2–3 show the lever 58 under conditions when the bag 18 is empty or at least not yet full. As the bag 18 begins to fill, the air pressure within the chute 52 begins to increase. When the pressure within the chute 52 reaches a predetermined level it will force the membrane 62 in outer direction 75 against the atmospheric pressure outside of the chute 52. As the membrane 62 is moved in outer direction 75 the rigid portion of 63 of the membrane 62 forces the lever 58 to pivot about the pivot member 68 in a clockwise direction as seen in FIG. 3. This motion causes the second end 59 of the lever 58 to switch the switching means 32 initiating the vacuum actuator 60. In the preferred embodiment, a vacuum is maintained within the vacuum actuator 60 unitl it is initiated by the switching means 32, thereby removing vacuum from within the vacuum actuator 60. It is also to be understood, however, that no vacuum can be maintained within the vacuum actuator 60 until it is initiated by the switching means 32, thereby establishing a vacuum within the vacuum actuator 60. It should be noted that the pivoting of the lever 58 in a clockwise direction requires enough force to overcome the biasing force of the spring 66. The position of the lever 58 after the membrane 62 has been moved in outer direction 75 is shown in dashed lines in FIG. 3. It should be noted that when the lever 58 is in this activated position that the spring 66 now biases the lever 58 away from the membrane 62, i.e. in a de-activated position.

With continuing reference to FIGS. 1–4, the continued operation of the bag-full indicator mechanism 50 will first be described wherein the switching means 32 includes the air valve 54. The air valve 54 is closed by the second end 59 of the lever 58. This cuts off the vacuum actuator 60 from the vacuum means 24. When the air valve 54 is closed, air is drawn through the holes 53 in the air valve 54, on through the vacuum line 73 and into the vacuum actuator 60 thereby removing the vacuum from the vacuum actuator 60. This forces the first side 71 of the vacuum actuator 60 as well as the connector link 61 to move in outward direction 83. This motion of the connector link 61 is used then by the shut off means 80 for shutting off the cutting blades 20 as will be discussed further below. To reset the membrane 62 once the bag 18 has been emptied, the reset button 70 is manually pressed in inner direction 76 forcing the lever 58 to pivot about the pivot member 68 in a counterclockwise direction as seen in FIG. 3. This causes the lever extension 56 to press the ridged portion 63 of the membrane 62 in the inner direction 76 until the membrane reaches the de-activated position.

With reference now to FIGS. 1, 3, and 8, the operation of the bag-full indicator mechanism 50 will now be considered when the switching means 32 includes the electric switch 34. The second end 59 of the lever 58 presses the tip 35 of the electric switch 34 thereby closing the electric switch 34. This permits an electric signal to move from the power source 16 on to the solenoid valve 36 thereby closing the solenoid valve 36. This cuts off the vacuum actuator 60 from the vacuum means 24. When the solenoid valve 36 is closed, air is drawn through the holes 49 in the solenoid valve 36, on through the vacuum line 73 and into the vacuum actuator 60 thereby removing the vacuum within the vacuum actuator 60. This forces the first side 71 of the vacuum actuator 60 to move in outward direction 83. This forces the connector link 61 to also move in outward direction 83. This motion of the connector link 61 is used then by the shut-off means 80 for shutting off the cutter blades 20 as will be discussed below. It should be noted that the sensitivity of bag-full indicator mechanism 50 is adjustable using the adjustment screw 74 to adjust the spring 66. Alternately, the spring 66 could be switched with another spring having a different spring rate.

With reference now to FIG. 9, the operation of the shut-off means 80 will now be described. As noted above, the first side 71 of the vacuum actuator 60 is moved in outward direction 83. This moves the connector link 61 in outward direction 83 as well forcing the brake member 38 to pivot about the pivot point 42 in a clockwise direction as seen in FIG. 9. It should be noted that the return spring 44 assists in this clockwise rotation of the brake member 38 about the pivot point 42. As the brake member 38 pivots in a clockwise direction two actions occur to stop the cutting blades 20 (as shown in FIG. 2). First, the idler pulley 37 is also moved in outward direction 83, thereby disengaging the belt 17. This prevents the engine pulley 15 from rotating the mower deck pulley 21. The second action that occurs when the brake member 38 pivots about the pivot point 42 in a clockwise direction is that the brake puck 40 comes into physical contact with the outer surface of the belt 17, forcing it against the mower deck pulley 21. This braking also prevents the mower deck pulley 21 from rotating and therefore stops the cutting blades 20 from cutting i.e., from rotating.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A method of indicating that a bag is full, comprising the steps of:

providing a mower having a mower deck with cutting blades for cutting associated vegetation, a bag for collecting cut vegetation, and a chute communicating the mower deck with the bag;

providing a bag-full indicator mechanism including a vacuum actuator having a first side, a vacuum means, sensing means, activating means, indicating means having a connector link with first and second ends, a first vacuum line that communicates air between the activating means and the vacuum means, and a second vacuum line that communicates air between the activating means and the vacuum actuator;

connecting the first end of the connector link to the first side of the vacuum actuator;

filling the bag with cut vegetation;

sensing that the bag is full with the sensing means;

activating the vacuum actuator with the activating means;

moving the first side of the vacuum actuator in a first direction;

moving the connector link in the first direction; and, indicating that the bag is full with the indicating means.

2. The method of claim 1 further comprising the steps of:

providing a membrane that covers an aperture in the chute and is selectively moveable inward and outward with respect to the chute; and, wherein the step of sensing that the bag is full with the sensing means, comprises the step of forcing the membrane outward from a de-activated position to an activated position.

3. The method of claim 2 further comprising the steps of:

providing the membrane with a rigid portion and a flexible portion that surrounds the rigid portion and is operatively connected to the chute; and, covering the aperture fully when the membrane is moved inward and outward with respect to the chute.

4. The method of claim 1 further comprising the steps of:

providing a selectively moveable membrane that covers an aperture in the chute;

providing a lever having a first end pivotably connected to biasing means that biases the lever toward the membrane when the lever is in a first position, a second end pivotably connected to a pivot member fixedly connected to the chute, and a lever extension positioned between the first and second ends of the lever;

providing switching means positioned into operative condition with respect to the second end of the lever; and, wherein the step of activating the vacuum actuator with the activating means, comprises the steps of:

A) forcing the membrane from a de-activated position to an activated position and into contact with the lever extension;

B) pivoting the lever about the pivot member from the first position to a second position;

C) switching the switching means; and,

D) initiating the vacuum actuator.

5. The method of claim 4 further comprising the steps of:

wherein the step of switching the switching means, comprises the step of communicating the vacuum actuator with the atmosphere; and, wherein the step of initiating the vacuum actuator, comprises the step of removing vacuum from within the vacuum actuator.

6. The method of claim 4 further comprising the step of:

biasing the lever with the biasing means away from the membrane when the lever is in the second position.

7. The method of claim 6 further comprising the steps of:

providing the lever with a reset button; and, wherein after the step of indicating that the bag is full with the indicating means, the method comprises the steps of:

A) pressing the reset button thereby overcoming the biasing means;

B) forcing the lever to pivot about the pivot member from the second position to the first position;

C) contacting the membrane with the lever extension;

D) forcing the membrane from the activated position to the de-activated position.

8. The method of claim 1 further comprising the steps of:

providing the mower with an engine and engine pulley;

providing the mower deck with a mower deck pulley for use in rotating the cutting blades;

providing a belt that operatively connects the engine pulley to the mower deck pulley;

providing an idler pulley operatively connected to the belt;

connecting the second end of the connector link to the idler pulley;

moving the idler pulley in the first direction;

disengaging the belt; and, stopping the cutting blades from cutting.

9. A method of indicating that a bag is full, comprising the steps of:

providing a mower having a mower deck with cutting blades for cutting associated vegetation, a bag for collecting cut vegetation, and a chute communicating the mower deck with the bag;

providing a membrane that covers an aperture in the chute and is selectively moveable inward and outward with respect to the chute;

providing a lever having a first end pivotably connected to biasing means that biases the lever toward the membrane when the lever is in a first position, a second end pivotably connected to a pivot member fixedly connected to the chute, and a lever extension positioned between the first and second ends of the lever;

providing switching means positioned into operative condition with respect to the second end of the lever;

providing a vacuum actuator with a first side that moves inwardly as a vacuum is established inside the vacuum actuator and that moves outwardly as a vacuum is removed from the vacuum actuator;

providing shut-off means for stopping the cutting blades from cutting;

providing a connector link having a first end operatively connected to the first side of the vacuum actuator and a second end operatively connected to the shut-off means;

filling the bag with cut vegetation;

forcing the membrane outward with respect to the chute from a de-activated position to an activated position and into contact with the lever extension;

pivoting the lever about the pivot member from the first position to a second position;

switching the switching means;

communicating the vacuum actuator with the atmosphere;

removing vacuum from within the vacuum actuator;

moving the first side of the vacuum actuator in a first direction;

moving the connector link in the first direction; and, stopping the cutting blades from cutting.

10. The method of claim 9 further comprising the steps of:

providing the lever with a reset button;

wherein after the step of stopping the cutting blades from cutting, the method comprises the steps of:

A) biasing the lever with the biasing means away from the membrane when the lever is in the second position;

B) pressing the reset button thereby overcoming the biasing means;

C) forcing the lever to pivot about the pivot member from the second position to the first position;

D) contacting the membrane with the lever extension;

E) forcing the membrane from the activated position to the de-activated position.

11. The method of claim 10 further comprising the steps of:

providing the mower with an engine and engine pulley;

providing the mower deck with a mower deck pulley for use in rotating the cutting blades;

providing a belt that operatively connects the engine pulley to the mower deck pulley;

providing an idler pulley operatively connected to the belt;

connecting the second end of the connector link to the idler pulley; and, wherein the step of stopping the cutting blades from cutting, comprises the steps of:

A) moving the idler pulley in the first direction; and,

B) disengaging the belt.

* * * * *